April 11, 1950     K. R. LARSON     2,503,620
BASE FOR ARTIFICIAL FISH BAITS
Filed June 22, 1945     2 Sheets-Sheet 1
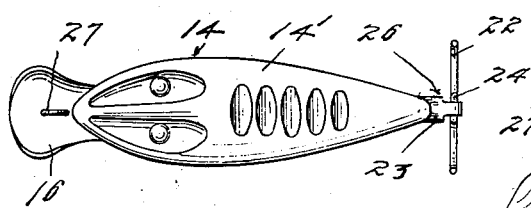
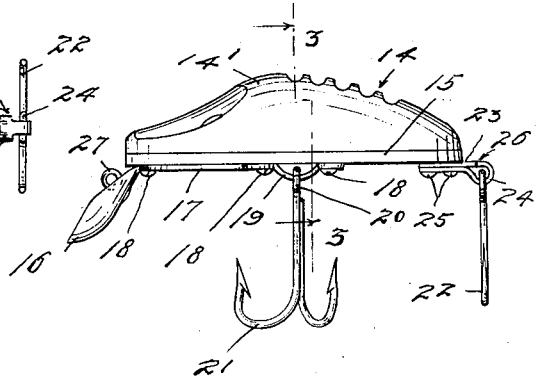
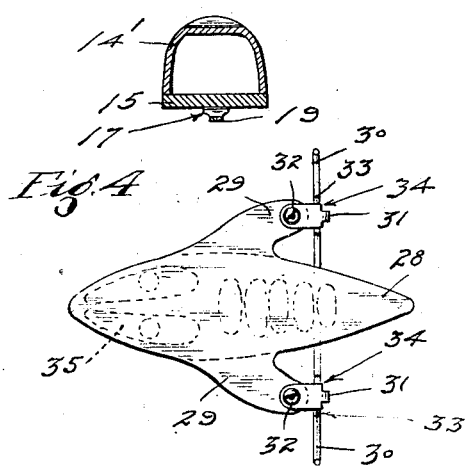
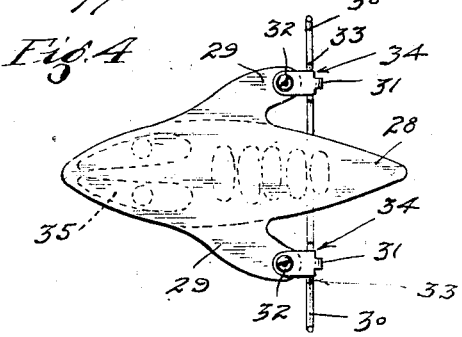
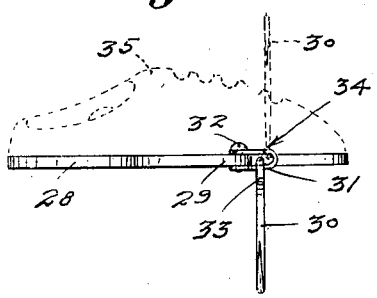
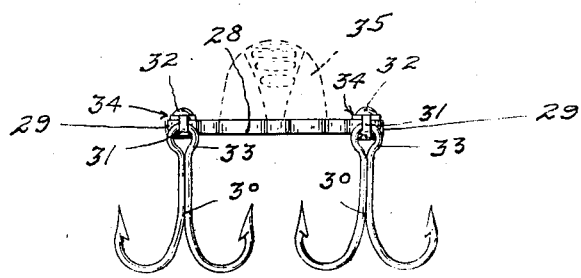
Inventor
Karl R. Larson
By his Attorney
Harry D. Kilgore April 11, 1950  K. R. LARSON  2,503,620
BASE FOR ARTIFICIAL FISH BAITS
Filed June 22, 1945  2 Sheets-Sheet 2
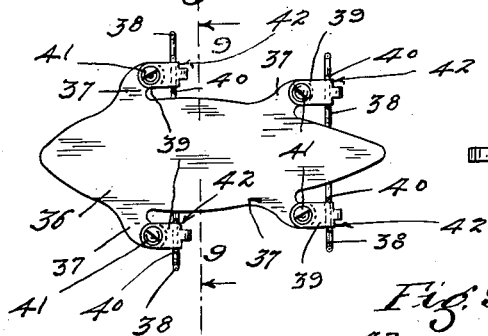
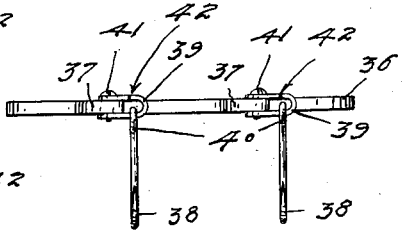
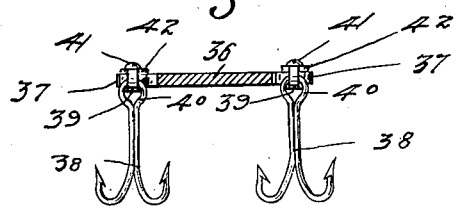
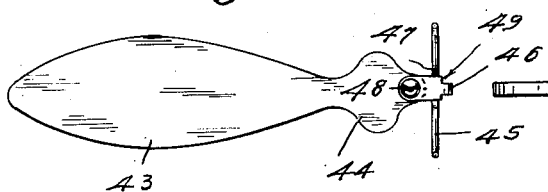
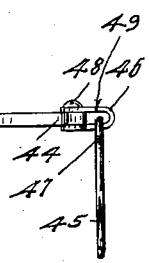
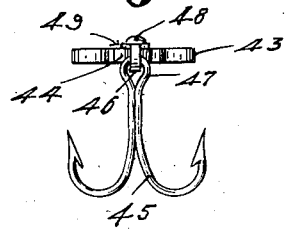
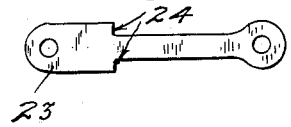
Inventor
Karl R. Larson
By his Attorney
Harry D. Kilgore Patented Apr. 11, 1950

2,503,620

UNITED STATES PATENT OFFICE 2,503,620

BASE FOR ARTIFICIAL FISH BAITS

Karl R. Larson, Minneapolis, Minn., assignor to The Paul Bunyan Bait Company, Minneapolis, Minn., a corporation of Minnesota Application June 22, 1945, Serial No. 601,026

1 Claim. (Cl. 43—42.35)

My present invention relates to improvements in artificial fish baits and, more particularly, to a base for a fish bait such as a bug, a crawfish and the like.

The principal object of this invention is to provide, for a particular type or kind of artificial fish bait body, a plurality of different bases substantially alike, but differently equipped with hooks or hooks and spoon, and any one of the bases being applicable to the particular bait body.

A further object of this invention is to provide bases for fish bait bodies that have side members simulating legs and tails, to which fishhooks are attached.

These and other objects of the invention will be apparent from the following description, reference being had to the drawings.

To the above end, generally stated, the invention consists of the novel construction and arrangement of parts hereinafter described and defined in the claim.

In the accompanying drawings, which illustrate the invention, like characters indicate like parts throughout the several views.

Referring to the drawing:

Fig. 1 is a plan view of a fish bait showing one embodiment of the invention;

Fig. 2 is a side elevation of the same;

Fig. 3 is a sectional view taken on the line 3—3 of Fig. 2;

Fig. 4 is a plan view showing a modification of the base shown in Figs. 1, 2 and 3, and also showing on the base, by means of broken lines, a body identical with the body shown in Fig. 1;

Fig. 5 is a side elevation of the invention shown in Fig. 4;

Fig. 6 is a rear end elevation of the invention shown in Figs. 4 and 5;

Fig. 7 is a plan view showing another modification of the base;

Fig. 8 is a side elevation of the invention shown in Fig. 7;

Fig. 9 is a view partly in elevation and partly in section taken on the line 9—9 of Fig. 7;

Fig. 10 is a plan view showing still another modification of the base;

Fig. 11 is a side elevation of the base shown in Fig. 10;

Fig. 12 is a rear end elevation of the base shown in Figs. 10 and 11; and

Fig. 13 is a plan view of one of the hook-attaching clevises before the same is bent to its final form.

Referring to the invention shown in Figs. 1, 2 and 3, the numeral 14 indicates an artificial fish bait in the form of a bug. This bait 14 is in the form of a hollow plastic body 14' having an open bottom.

The body 14' is cemented to a flat base 15, the perimeter of which coincides with the perimeter of the contacting bottom of the body 14'. A spoon 16 integral with one end of a metal bar 17 extends forwardly and downwardly from the front end of the base 15. The bar 17 extends longitudinally under the base 15, at its transverse center, and is secured to said base by screws 18. Said bar 17 is bent to form a bow 19, between two of the screws 18 substantially at the longitudinal center of the base 15. The eye 20 of triple hooks 21 is interlocked with the bow 19 and holds said hook suspended from the base 15. A pair of hooks 22 is attached to the base 15 by a coupling member 23 folded upon itself to form an eye 24 with which the eye of the hooks 22 is interlocked. This coupling member 23 is aligned with the bar 17 and attached to the base 15, at its under side by a pair of screws 25. Stop shoulders 26 on the coupling member 23 limit the upwardly and forwardly swinging movement of the hooks 22 and thereby prevent said hooks from lying on the body 14' in an inoperative position. An eye 27 on the spoon 16 affords means by which the bait 14 may be attached to a fishline, not shown.

Referring now in detail to the base 28 shown in Figs. 4, 5 and 6, which is a duplicate of the base 15 with the exception that it is provided at its side with a pair of integral rearwardly and outwardly projecting extensions 29. These extensions simulate legs and are provided for attaching hooks to the base 28. A pair of hooks 30 is attached to each extension 29 by a small clevis 31. A screw 32 pivotally attaches each clevis 31 to the respective extension 29. Eyes 33 formed by the shanks of the hooks 30 are interlocked with the clevises 31. Shoulders 34 on the clevises 31 are provided for the same purpose as the shoulders 26. A bait body 35, identical with the body 14' is shown mounted on the base 28 by means of broken lines.

Referring now in detail to the invention shown in Figs. 7, 8 and 9, the base 36 is identical with the base 14', with the exception that it is provided on each side with a pair of integral outwardly and rearwardly projecting extensions 37. These extensions 37 simulate legs and are provided for attaching hooks to the base 36.

A pair of fishhooks 38 is attached to each extension 37 by a clevis 39 that is interlocked with eyes 40 formed by the shanks of said hooks, Screws 41 attach the clevises 39 to the extensions 37. Shoulders 42 similar to the shoulders 26 and 34 are formed on each clevis 39.

The base 43 shown in Figs. 10, 11 and 12 is identical with the base 14' with the exception that it has a rearwardly projecting integral extension 44 that simulates a tail. A pair of hooks 45 is attached by a small clevis 46 to the extension 44. This clevis 46 is interlocked with an eye 47, formed by the shanks of the hooks 45, and is attached by a screw 48 to the extension 44. Formed on each clevis 46 is a pair of shoulders 49 that serve the same purpose as the shoulders 26, 34 and 42.

Fig. 13 shows the member 23 before the same is folded and all of the clevises 31, 39 and 46 are of similar shape.

From the above description of the invention and its several modifications, it is evident that a manufacturer or retailer may carry in stock a plurality of artificial bait bodies of a given type together with a plurality of separate bases therefor. These bases are identical except that they are differently equipped with hooks or hooks and spoons that vary in number, size and arrangement, and the means on the bases for attaching the hooks thereto. With such a supply of identical bait bodies as bases that are differently equipped with hooks or hooks and spoons, it is only necessary to cement one of the bodies on a selected base to fill a specific order as to the number, size and arrangement of hooks and a spoon if called for.

What I claim is:

An artificial bait comprising a base in the form of an elongated flat plate, the perimeter of its end portions being tapered to relatively sharp points, and a body member in the form of a shell, the under side of which is open, the endless bottom edge portion of the body member resting on the base and cemented thereto, said body at the base being substantially confluent with the perimeter of the base, said body member having a head portion and a tail portion merging in a hump, said head portion having a central longitudinally extended rib and a long cavity at each side of the rib, said tail portion having transverse laterally spaced grooves.

KARL R. LARSON.

REFERENCES CITED

The following references are of record in the file of this patent:

UNITED STATES PATENTS

| Number | Name | Date |
| --- | --- | --- |
| 1,345,600 | Keeling | July 6, 1920 |
| 1,417,441 | Adams | May 23, 1922 |
| 1,807,283 | Dick | May 26, 1931 |
| 1,948,005 | Pflueger | Feb. 20, 1934 |
| 1,949,757 | Murdoch | Mar. 6, 1934 |
| 1,982,609 | Freese | Nov. 27, 1934 |
| 1,993,018 | Pfeifle | Mar. 5, 1935 |
| 2,011,075 | Pflueger | Aug. 13, 1935 |
| 2,184,792 | Clarke | Dec. 26, 1939 |
| 2,186,780 | DeWitt | Jan. 9, 1940 |
| 2,221,381 | Hosmer | Nov. 12, 1940 |
| 2,270,487 | Withey | Jan. 20, 1942 |
| 2,453,758 | Risch | Nov. 16, 1948 |